US008514974B1

(12) United States Patent
Riekkinen

(10) Patent No.: US 8,514,974 B1
(45) Date of Patent: Aug. 20, 2013

(54) METHOD AND APPARATUS FOR CONTROLLING A TRANSMIT POWER

(71) Applicant: Renesas Mobile Corporation, Tokyo (JP)

(72) Inventor: Ville Erkki Tapio Riekkinen, Oulu (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/648,819

(22) Filed: Oct. 10, 2012

(30) Foreign Application Priority Data

Feb. 16, 2012 (GB) .................................. 1202677.9

(51) Int. Cl.
*H04K 1/02* (2006.01)
(52) U.S. Cl.
USPC ........... 375/297; 375/295; 375/147; 455/522; 455/442; 370/318; 370/335
(58) Field of Classification Search
USPC ........................................................ 375/297
See application file for complete search history.

(56) References Cited

U.S. PATENT DOCUMENTS

| 6,493,333 | B1 * | 12/2002 | Kim et al. ...................... 370/342 |
| 7,190,964 | B2 * | 3/2007 | Damnjanovic et al. ....... 455/522 |
| 8,139,498 | B2 * | 3/2012 | Seo et al. ...................... 370/252 |
| 2002/0015438 | A1 * | 2/2002 | Ishizu et al. ................... 375/147 |
| 2006/0034226 | A1 | 2/2006 | Gu et al. |
| 2006/0246936 | A1 * | 11/2006 | Gross et al. .................... 455/522 |
| 2010/0153049 | A1 | 6/2010 | Ventola et al. |
| 2010/0177816 | A1 * | 7/2010 | Malipatil et al. .............. 375/233 |

FOREIGN PATENT DOCUMENTS

| EP | 2 360 837 A1 | 8/2011 |
| WO | WO 2008/130693 A2 | 10/2008 |

OTHER PUBLICATIONS

Search Report under Section 17 dated Jun. 27, 2012 which is issued in a related British Application No. GB1202677.9 (4 pages).
3GPP TS 25.101 v9,4.0, Technical Specification, Group Radio Access Network; User Equipment (UE) radio transmission and reception (FDD) (Release 9), Jun. 2010 (246 pages).
Motorola, Tdoc#R1-040642, TSG RAN WGI #37, "Comparison of PAR and Cubic Metric for Power De-rating," Montreal, Canada, May 10-14, 2004 (9 pages).
ETSI TS 125 213v9.2.0 Technical Specification, Universal Mobile Communications system (UMTS); "Spreading and modulation (FDD)" (3GPP TS25.213 version 9.2.0 Release 9) Oct. 2010, (40 pages).
Terry Ritter, "Walsh-Hadamard Transforms: A Literature Survey," Research Comments from Cipers by Ritter, www.ciphersbyritter.com/RES/WALHAD.HTM, (10 pages).
Bernard J. Fino et al, "Unified Matrix Treatment of the Fast Walsh-Hadamard Transform,"IEEE Transactions on Computers, vol. 25, Nov. 1976, pp. 1142-1146.

(Continued)

*Primary Examiner* — Lihong Yu
(74) *Attorney, Agent, or Firm* — Lucas & Mercanti LLP; Robert P. Michal

(57) ABSTRACT

An apparatus and a method are described which determine a maximum power reduction metric based on a comparison between a magnitude of at least one data channel and a magnitude of at least one control channel. A transmit power, for example of a user equipment, is controlled based on the determined maximum power reduction metric.

29 Claims, 2 Drawing Sheets

(56) References Cited

OTHER PUBLICATIONS

Agilent Technologies, "Characterizing Digitally Modulated Signals with CCDF Curves," Application Note, (24 pages) http://www.emce.luwien.ac.at/hfadmin/389087/download/Characterizing_Digitally_Modulated_Signals_width_CCDF_Curves_Agilent_Application_Note_5968-687SE_.pdf.

GSM Association official Document TS.09, "Battery Life Measurement and Current Consumption Technique," Version 6.3, May 25, 2011 (47 pages).

* cited by examiner

METHOD AND APPARATUS FOR CONTROLLING A TRANSMIT POWER

CROSS REFERENCE TO RELATED APPLICATIONS

This application claims the benefit under 35 U.S.C. §119 (a) and 37 CFR 1.55 to UK Patent Application No. 1202677.9, filed on Feb. 16, 2012, the entire content of which is hereby incorporated by reference.

TECHNICAL FIELD

The present invention relates to a method and apparatus for controlling a transmit power. Particular examples of embodiments of the invention include methods, devices and computer program products for controlling transmit power of a network element such as a user equipment (UE) by taking into account a maximum power reduction (MPR) value, including in particular MPR calculation for a High Speed Uplink Packet Access (HSUPA) signal with 4 state pulse amplitude modulation (4PAM).

BACKGROUND

The following meanings for the abbreviations used in this specification apply:

| | |
|---|---|
| 3GPP | 3rd Generation Partnership Project |
| 4PAM | 4 state pulse amplitude modulation |
| ACK | Acknowledgement |
| ACLR | Adjacent Channel Leakage Ratio |
| AMR | Adaptive Multi-Rate |
| CM3 | Cubic Metric |
| DPCCH | Dedicated Physical Control Channel |
| DPDCH | Dedicated Physical Data Channel |
| DTX | Discontinuous Transmission |
| E-DPCCH | Enhanced Dedicated Physical Control Channel |
| E-DPDCH | Enhanced Dedicated Physical Data Channel |
| EVM | Error Vector Magnitude |
| HS-DPCCH | High Speed Dedicated Physical Control Channel |
| HSPA | High Speed Packet Access |
| HSUPA | High Speed Uplink Packet Access |
| LTE | Long Term Evolution |
| MPR | Maximum Power Reduction |
| NACK | Negative Acknowledgement |
| PA | Power Amplifier |
| PAR | Peak to Average Ratio |
| RF | Radio Frequency |
| RRC | Root Raised Cosine |
| SE | Spurious Emission |
| SF | Spreading Factor |
| TTI | Transmission Time Interval |
| WCDMA | Wideband Code Division Multiple Access |
| WIMAX | Worldwide Interoperability for Microwave Access |
| WLAN | Wireless Local Area Network |

Embodiments of the present invention relate to controlling transmit power of a network element, such as a user equipment (UE). Particular embodiments of the present invention relate to calculation of maximum power reduction (MPR) for 4PAM modulated high speed uplink packet access (HSUPA) signals, which is a measure that approximates non-linearities of a power amplifier and which is required in determination of power amplifier back off.

Power amplifiers (PA) of transmitters are in general non-linear, which causes distortion that increases the Error Vector Magnitude (EVM) and spurious emissions (SE). Signals that have a higher Peak to Average Ratio (PAR) will also have a higher linearity requirement for the PA. There are two possibilities to meet the higher linearity requirement: either the PA is designed to be more linear or the operating point of the existing PA has to be set so that the signals do not get distorted. As the PAs become more expensive from the point of view of manufacturing cost and power consumption when the linearity of the PA is increased, it is often more desirable to use the existing PA designs. The distortion (and thus EVM and SE) of the PA can be controlled by adjusting its operating point. Typically, when PAR of the base band signal is increased, the operating point of the PA has to be adjusted towards a more linear region in order to maintain EVM and ACLR. This adjustment can be done by increasing an output back-off of the PA.

A practical example of the increase in PAR is in HSPA wherein the HS-DPCCH and E-DPDCH channels are multiplexed into the Release 99 channels. For high power levels this will cause the power amplifier to work in a non-linear region, thus increasing ACLR and spectrum mask leakage. In order to tackle this problem and to enable use of PAs that have been designed for the Release 99, the standard allows the UE to reduce the maximum transmit power when HS-DPCCH and/or E-DCH are present. The allowed reduction of MPR has been introduced already in Release 5 and remains valid for the next releases as well.

The calculation of the maximum power reduction (MPR) involves the cubic metric (CM3), which was taken into use by 3GPP as it was found that PAR is not the best metric to estimate the actual impact of the PA and a table-based approach, which was used in previous 3GPP Releases, would have been too complicated. The cubic metric value approximates the 3rd order non-linearity of the PA better than PAR and thus enables a generalisation of the amount of PA back-off allowed to fulfill the ACLR requirements.

There are two fundamental problems in the cubic metric calculation. First, the cubic metric is computationally rather complex, especially when 4PAM is used, and it has to be calculated every time the channel gain factors change. In principle the calculation for every TTI would be enough, but due to the HS-DPCCH transmission (ACKTNACK or DTX) it may change on every slot and therefore CM3 must be determined for every slot. Furthermore, if E-DPDCH scaling occurs, the cubic metric has to be re-calculated within the current slot before the data is to be transmitted. Secondly, there is no time to calculate the cubic metric after the RRC filtering (i.e. pulse-shaping) as some time has to be allocated for the transmitter to set up the back off. The samples at the output of the pulse shaping filter would be the correct ones to use. However, due to the latency and computational complexity, a method that allows calculation of CM3 prior to the pulse shaping filter is preferable.

For HSUPA, 3GPP TS 25.101 Chapter 6.2.2. sets the requirements for the Cubic Metric and MPR. How the Cubic Metric/MPR is actually computed/estimated is vendor dependent, but all of the methods have to be basically based on the beta-values of each uplink channel, i.e. channel gain factors, which are described in 3GPP TS 25-213.

The formula for calculating the Cubic Metric (CM) as defined in chapter 6.2.2 of 3GPP TS 25.101 is as follows:

$$CM = CEIL\{[20*\log 10((v\_norm^3)_{rms}) - 20*\log 10((v\_norm\_ref^3)_{rms})]/k, 0.5\}$$

where
CEIL $\{x, 0.5\}$ means rounding upwards to closest 0.5 dB, i.e. CM□[0, 0.5, 1.0, 1.5, 2.0, 2.5, 3.0, 3.5]
k is 1.85 for signals where all channelisations codes meet the following criteria: $C_{SF,N}$ where $N < SF/2$ k is 1.56 for signals were any channelisations codes meet the following criteria: $C_{SF,N}$ where $N \geq SF/2$ v_norm is the normalised voltage waveform of the input signal v_norm_ref is the normalised voltage waveform of the reference signal (12.2 kbps AMR Speech) and $20*\log 10((v\_norm\_ref^3)_{rms})=1.52$ dB One method to estimate MPR/cubic metric is illustrated in US-A1-2010/153049 "Calculating a Non-Linearity Metric". This method defines all possible uplink signal states before spreading, scrambling and pulse shaping operations and estimates MPR and Cubic Metric using the defined signal states and the above-listed MPR/cubic metric calculation formula given in chapter 6.2.2 of 3GPP TS 25.101 mentioned above.

Even though the method illustrated in US2010-A1-153049 simplifies the theoretical cubic metric/MPR calculation, it is still rather computationally complex. A complex calculation may cause problems for HSUPA signals having 4PAM modulation due to the tight timing requirements of MPR and cubic metric calculation.

Therefore a simpler solution to define the cubic metric and MPR for HSUPA signal with 4PAM is needed to be able calculate MPR/cubic metric as specified in 3GPP TS 25.101.

SUMMARY

In a first exemplary embodiment, the invention is directed to an apparatus comprising a processing system constructed and arranged to cause the apparatus to determine a maximum power reduction metric based on a comparison between a magnitude of at least one data channel and a magnitude of at least one control channel, and control a transmit power based on the determined maximum power reduction metric.

The processing system may comprise at least one processor, and at least one memory including computer program code, the at least one memory and the computer program being arranged to, with the at least one processor, cause the apparatus to operate as described above.

In a second exemplary embodiment, the invention is directed to a method comprising: determining a maximum power reduction metric based on a comparison between a magnitude of at least one data channel and a magnitude of at least one control channel, and controlling a transmit power based on the determined maximum power reduction metric.

There is also provided a computer program comprising computer-executable instructions which, when executed on a computing device, cause the computing device to carry out a method as described above.

Thus, according to embodiments of the present invention, a simple and reliable method for determining a MPR_metric and controlling transmit power based on this MPR_metric is achieved.

Advantageous developments are defined in the dependent claims.

The present invention addresses the situation discussed above and deals in exemplary embodiments with providing a simpler solution to determine a MPR_metric.

BRIEF DESCRIPTION OF THE DRAWINGS

For a more complete understanding of example embodiments of the present invention, reference is now made to the following description taken in connection with the accompanying drawings in which.

DETAILED DESCRIPTION

Exemplary aspects of the invention will be described herein below.

Figure 1:
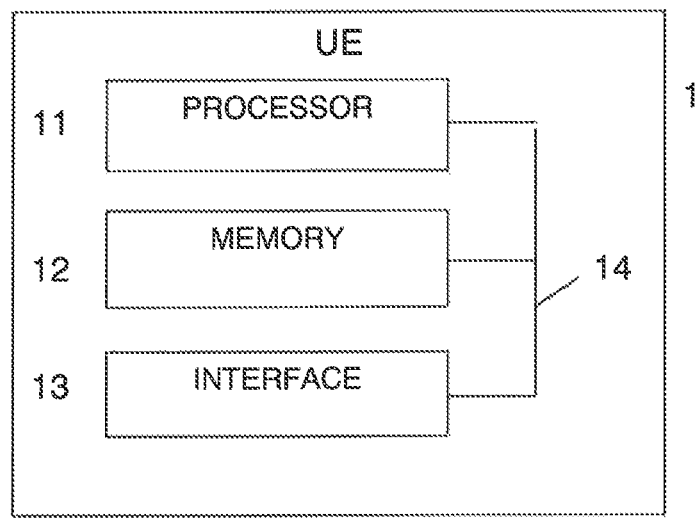
FIG. 1 schematically illustrates an example of a UE according to an embodiment of the present invention.

FIG. 1 illustrates a simplified block diagram of a user equipment (UE) 1 according to a general embodiment of the present invention. It is noted that the UE, and the corresponding apparatus according to the embodiment, may consist only of parts of the UE, so that the apparatus may be installed in a UE for example. Moreover, the UE is only an example and may be replaced by another suitable network element.

The UE 1 according to this embodiment comprises a processor 11 and a memory 12. The memory includes a computer program, wherein the memory 12 and the computer program are configured to, with the processor, cause the apparatus to perform several operations as described in the following.

Figure 2:
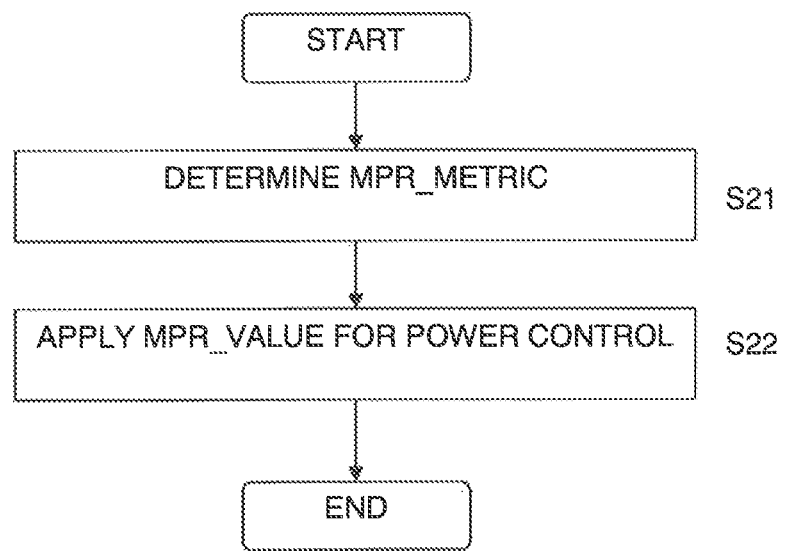
FIG. 2 schematically illustrates an example of a basic operation according to a general embodiment of the present invention.

FIG. 2 shows a flow chart for describing an example of the basic operation, which may be performed by the UE 1 shown in FIG. 1. In particular, in S21, a maximum power reduction metric is determined based on a comparison between a magnitude of at least one data channel and a magnitude of at least one control channel, and, in S22, a transmit power is controlled based on the determined maximum power reduction metric.

That is, according to this example, a maximum power reduction metric is determined, and this maximum power reduction metric can be used for determining a maximum power reduction value for a transmit power of a UE.

Optionally, the UE 1 may also comprise an interface 13 for providing connections to other network elements. Moreover, the processor 11, the memory 12 and the interface 13 may be interconnected by a suitable connection 14, e.g. a bus or the like. Moreover, it is noted that the apparatus may comprise more than one processor, more than one memory and/or more than one interface, if this is suitable for a particular structure.

The above general embodiment of the present invention may be modified as follows.

A final maximum power reduction value may be determined based on a comparison of the determined maximum power reduction metric with a plurality of thresholds. For example, the thresholds and maximum power reduction values corresponding to these thresholds may be provided in a form of a look-up table. A detailed example for such a look-up table is given later with reference to Table 1 below.

The data and/or control channels may be modulated by a 4 state pulse amplitude modulation (4PAM). For example, in WCDMA/HSUPA, only the data channels (E-DPDCH) may be 4PAM modulated. As already described above, in particular when such a kind of modulation is applied, a calculation by means of a cubic metric is very complex, so that in such a case the simplified method according to the present embodiments is advantageous.

The comparison between the magnitude of the at least one data channel and the magnitude of the at least one control channel may be effected by calculating a ratio between the magnitude of the at least one data channel and the magnitude of the at least one control channel. For example, a quotient of the two magnitudes may be determined such that the magnitude of the at least one data channel is set in the numerator and the magnitude of the at least one control channel is set in the denominator, or vice versa.

Furthermore, in most cases, a plurality of data channels and a plurality of control channels may be present. In this case, the ratio is calculated between a sum of magnitudes of the data channels and a sum of the magnitudes of the control channels.

Moreover, in addition a high speed control channel (e.g. a high speed dedicated physical control channel (HS-DPCCH)) may be used. In this case, the magnitude of the high speed control channel is either added to the magnitude of the data channel or to the magnitude of the control channel, or to the sum of the magnitudes of the data channels or to the sums of the magnitude of the control channels, as the case may be. That is, when the magnitude(s) of the data channel(s) is/are set in the numerator and the magnitude(s) of the control channel(s) is/are set in the denominator, the magnitude of the HS-DPCCH may be added either to the numerator or the denominator.

The magnitude of a respective channel may be expressed by an amplitude or a power of the respective channel. When the magnitude is an amplitude of the respective channel, the amplitude of a respective channel is expressed by a gain factor of the respective channel. When the magnitude is a power of the respective channel, the power of the respective channel is a square of a gain factor of the respective channel.

Moreover, also weighting factors may be added to the magnitudes as described above.

In the following, some examples of the channels mentioned above are given: the data channel may be an enhanced dedicated physical data channel (E-DPDCH), the control channel may be a dedicated physical control channel (DPCCH) and/or an enhanced dedicated physical control channel (E-DPCCH), and the high speed control channel may be a high speed dedicated physical control channel (HS-DPCCH).

$$\text{MPR\_metric} = \frac{\beta_{E-DPDCH1}^2 + \beta_{E-DPDCH2}^2 + \beta_{E-DPDCH3}^2 + \beta_{E-DPDCH4}^2 + \beta_{HS-DPCCH}^2}{\beta_{DPCCH}^2 + \beta_{E-DPCCH}^2}, \quad (1)$$

and the actual MPR-value when E-DPDCH channels are 4PAM modulated. $\beta_{channel\_name}$ refers to the gain factor of the given uplink channel.

The main idea behind the metric is to check whether the power of data channels is equal to or larger than the power of control channels, which would lead to higher MPR values. On the other hand, if the control channels are dominating, i.e. they have much higher power than data channels, the MPR would most likely be smaller as can be seen in FIG. 3.

Figure 3:
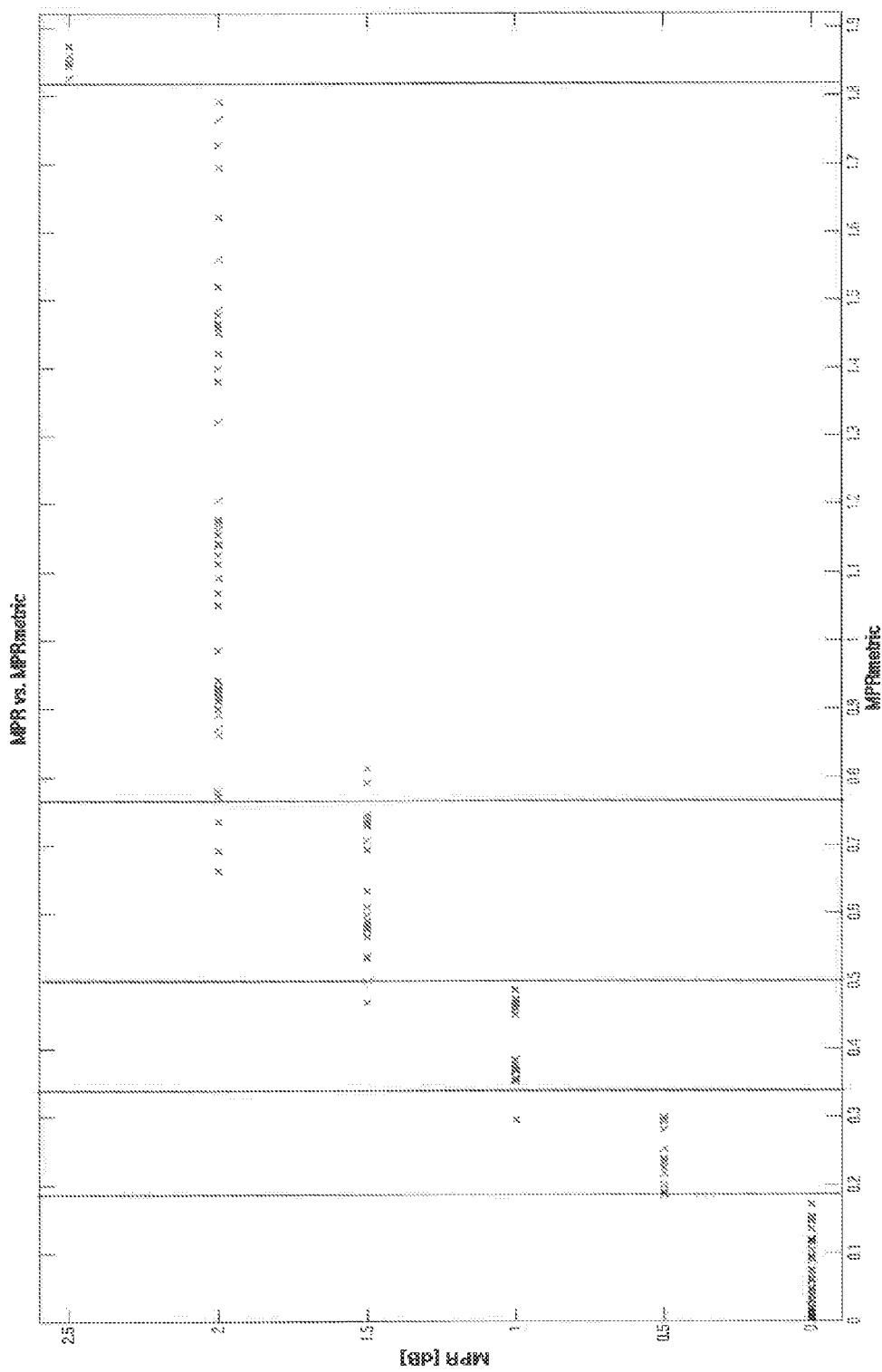
FIG. 3 schematically illustrates an example of MPR as a function of MPR_metric according to an embodiment of the present invention.

FIG. 3 shows schematically one example of how MPR behaves as a function of MPR_metric when the beta factor of HS-DPCCH is set to 5/15. As can be seen, the MPR values can be determined based on the MPR_metric, with 0.5 dB accuracy as defined in 3GPP TS 25-101.

Based on the MPR_metric, one can define thresholds for each MPR value for different HS-DPCCH scenarios. Thresholds are selected in such a way that the approximated MPR would always been within a ±0.5 dB (i.e. the accuracy required in 3GPP TS 25-101) from the actual MPR defined by 3GPP. An example of thresholds, with HS-DPCCH beta factor=5/15, is illustrated in FIG. 3 with vertical lines. MPR thresholds for all HS-DPCCH scenarios are gathered in the following Table 1.

In order to define MPR, the UE defines the MPR metric as specified in equation (1) described above and then just selects the correct MPR value based on the metric as defined in table 1 below:

TABLE 1

Thresholds for MPR_metric

| HS-DPCCH beta factor | MPR = 2.5 MPR_metric | MPR = 2.0 MPR_metric | MPR = 1.5 MPR_metric | MPR = 1.0 MPR_metric | MPR = 0.5 MPR_metric | MPR = 0.0 MPR_metric |
|---|---|---|---|---|---|---|
| 0/15, . . . , 15/15 | >1.82 | <=1.82 & >0.77 | <=0.77 & >0.50 | <=0.50 & >0.34 | <=0.32 & >0.19 | <0.19 |
| 19/15, . . . , 24/15 | >2.0 | <=2.0 & >1.1 | <=1.1 & >0.7 | <=0.7 & >0.45 | <=0.45 & >0.24 | <0.24 |
| 30/15 | >3.3 | <=3.3 & >1.8 | <=1.8 & >0.75 | <=0.75 & >0.45 | <=0.45 & >0.27 | <0.27 |
| 38/15 | >6.0 | <=6.0 & >1.85 | <=1.85 & >0.96 | <=0.96 & >0.55 | <=0.55 & >0.24 | <0.24 |

Hence, according to particular embodiments of the present invention, a very low computational complex method is provided to calculate MPR for HSUPA signal with 4PAM. The proposed method defines a metric for the MPR-value based on channel gain factors and obtains the actual MPR-value for the given signal from a look-up-table using the calculated metric.

In the following, a more detailed embodiment is described, according to which the powers of the different signals are considered. That is, as mentioned above, for calculating a maximum power reduction metric, squares of gain factors of the respective channels are used.

In general, based on empirical studies carried out by the inventors, it can be shown that there is an interconnection between "MPR_metric", which is defined as follows:

The difference between the MPR approximation and real MPR are illustrated in the following based on simulation results.

In particular, MPR results were simulated over all possible E-DPCCH and E-DPDCH beta factors that can be applied for an E-DCH channel configuration with 4PAM modulation. 4PAM is allowed when all four E-DPDCH channels are active. All possible E-DPCCH/E-DPDCH beta factors are given in 3GPP TS 25-213.

Table 2 gathers the results obtained with different possible HS-DPCCH beta factors when 4PAM is applied on all E-DPDCH channels. Here the approximation difference [dB] is defined as MPRapproximated—MPR3GPP. It can be seen that the approximated MPR values corresponds very well to the actual ones.

TABLE 2

Difference between approximated MPR and the actual MPR with 4PAM modulated E-DPDCH channels.

| | Approximation difference % | | | | |
|---|---|---|---|---|---|
| HS-DPCCH beta * 1.5 | −1.0 dB | −0.5 dB | 0 dB | 0.5 dB | 1.0 dB |
| 0 | — | 2.0 | 97.3 | 0.7 | — |
| 5 | — | 2.1 | 97.2 | 0.7 | — |
| 6 | — | 2.8 | 97.7 | 0.5 | — |
| 8 | — | 2.8 | 96.7 | 0.5 | — |
| 9 | — | 3.0 | 96.5 | 0.5 | — |
| 12 | — | 2.3 | 96.4 | 1.3 | — |
| 15 | — | 1.8 | 95.2 | 3.0 | — |
| 19 | — | 6.5 | 92.1 | 1.4 | — |
| 24 | — | 4.1 | 90.0 | 5.9 | — |
| 30 | — | 9.6 | 83.2 | 6.5 | 0.7 |
| 38 | — | 14.5 | 74.9 | 6.3 | 4.3 |

NOTE: E-DPDCH channel configuration is always "2xSF2 + 2xSF4" with 4PAM and DPDCH is not present The computational complexity of the provided method to calculate the MPR/cubic metric for an HSUPA signal with 4PAM is significantly lower than the computational complexity according to the prior art. Therefore the proposed solution enables the MPR/cubic metric calculation in a UE as specified in 3GPP TS 25-101 without causing timing problems due to the computational complexity.

It is noted that the invention is not limited to the specific embodiments as described above.

For example, the calculation of the MPR_metric is not limited to the formula (1) described above, and several modifications are possible.

According to a first modification of the above embodiment, the formula (1) is modified such that the HS-DPCCH gain factor is moved into the denominator, as shown in formula (2):

$$\text{MPR\_metric} = \frac{\beta^2_{E-DPDCH1} + \beta^2_{E-DPDCH2} + \beta^2_{E-DPDCH3} + \beta^2_{E-DPDCH4}}{\beta^2_{DPCCH} + \beta^2_{E-DPCCH} + \beta^2_{HS-DPCCH}} \quad (2)$$

In this way, similar results as described above can be achieved.

According to a second modification, the squaring of the gain factors in formula (1) is omitted, that is, the gain factors are summed up as they are for determining a MPR_metric. Then, the MPR values are determined based on this MPR_metric. According to this modification, the amplitudes of each channel would be used instead of the powers as in the formula (1) described above. It is noted that the beta factor or gain factor relates to the amplitude of the given channel and the squared beta factor is related to the power of the given channel.

Thus, according to the second modification, the MPR_metric may be calculated based on the following formula (3):

$$\text{MPR\_metric} = \frac{\beta_{E-DPDCH1} + \beta_{E-DPDCH2} + \beta_{E-DPDCH3} + \beta_{E-DPDCH4} + \beta_{HS-DPCCH}}{\beta_{DPCCH} + \beta_{E-DPCCH}} \quad (3)$$

Similarly as described above in connection with the first modification, formula (3) can also be modified such that the beta factor for the HS-DPCCH is moved into the denominator.

According to a further modification, weighting factors are added to some or all of the (squared or linear) gain factors. In this way, the MPR_metric can be determined by taking into account special requirements for some of the channels, for example.

According to another modification, it is also possible to add a constant to the MPR_metric determined as described above (e.g. new_MPR_metric=A+MPR_metric) or some weighting to the MPR_metric as a whole could be applied (e.g. new_MPR_metric=A×MPR_metric), if this is advantageous for a further calculation process or the like.

According to a further modification, the gain factor of DPDCH (Release 99 data channel) may also be included in the numerator. Similarly as in the modifications described above, the linear gain factor of DPDCH ($\beta_{DPDCH}$) may be used, the squared gain factor of DPDCH ($\beta_{DPDCH}^2$) may be used, and/or a weighting factor may be applied.

Hence, according to the embodiments and modifications thereof, an MPR_metric is determined by comparing power/amplitude levels of E-DPDCH channels against power/amplitude levels of control channels, and based on this MPR_metric, a MPR value is determined/defined.

Thus, a simple and reliable method for determining an MPR value and controlling transmit power based on such an MPR value is obtained.

Thus, according to embodiments of the present invention, an apparatus and a method are provided, which determine a maximum power reduction metric based on a comparison between a magnitude of at least one data channel and a magnitude of at least one control channel, and control a transmit power, for example of a user equipment, based on the determined maximum power reduction metric.

According to another aspect of embodiments of the present invention, an apparatus is provided which comprises means for determining a maximum power reduction metric based on a comparison between a magnitude of at least one data channel and a magnitude of at least one control channel, and means for controlling a transmit power based on the determined maximum power reduction metric.

Embodiments of the present invention may be implemented in software, hardware, application logic or a combination of software, hardware and application logic. The software, application logic and/or hardware generally, but not exclusively, may reside on the devices' modem module. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment in general.

The present invention relates in particular but without limitation to mobile communications, for example to environments under LTE, WCDMA, WIMAX and WLN and can advantageously be implemented in user equipment or smart phones, or personal computers connectable to such networks. It can be implemented as/in chipsets to connected devices, and/or modems or other modules thereof.

If desired, at least some of different functions discussed herein may be performed in a different order and/or concurrently with each other. Furthermore, if desired, one or more of the above-described functions may be optional or may be combined.

It is to be understood that any of the above modifications can be applied singly or in combination to the respective aspects and/or embodiments to which they refer, unless they are explicitly stated as excluding alternatives.

Although various aspects of the invention are set out in the independent claims, other aspects of the invention comprise other combinations of features from the described embodiments and/or the dependent claims with the features of the independent claims, and not solely the combinations explicitly set out in the claims.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. Apparatus for use with a transmitter that transmits signals, the apparatus comprising:
   at least one processor; and
   at least one memory including computer program code;
   the at least one memory and the computer program code being configured to, with the at least one processor, cause the apparatus at least to:
   determine a maximum power reduction metric based on a comparison between a sum of a magnitude of each of a plurality of data channels in a signal being transmitted and a sum of a magnitude of each of a plurality of control channels in the signal being transmitted,
   determine a maximum power reduction value based on comparison of the determined maximum power reduction metric to a plurality of thresholds such that the maximum power reduction value varies depending on the relationship between the determined maximum power reduction metric and the thresholds, and
   control a transmit power of the transmitter based on the determined maximum power reduction value.

2. The apparatus according to claim 1, wherein the plurality of thresholds are predefined thresholds relating to gain of the signal being transmitted.

3. The apparatus according to claim 1, wherein the thresholds and maximum power reduction values corresponding to the thresholds are provided in a look-up table.

4. The apparatus according to claim 1, wherein the data and/or control channels are modulated by a 4 state pulse amplitude modulation (4PAM).

5. The apparatus according to claim 1, wherein the comparison between the sum of the magnitudes of the data channels and the sum of the magnitudes of the control channels is effected by calculating a ratio between the sum of the magnitudes of the data channels and the sum of the magnitudes of the control channels.

6. The apparatus according to claim 1, wherein a high speed control channel is included in the signal being transmitted, and the magnitude of the high speed control channel in the signal being transmitted is added to the sum of the magnitudes of the data channels in order to determine the maximum power reduction metric.

7. The apparatus according to claim 1, wherein the magnitude of a respective channel is an amplitude of the respective channel and the amplitude of a respective channel is expressed by a gain factor of the respective channel.

8. The apparatus according to claim 1, wherein the magnitude of a respective channel is a power of the respective channel and the power of a respective channel is expressed by a square of a gain factor of the respective channel.

9. The apparatus according to claim 1, wherein the at least one memory and the computer program code are further configured to, with the at least one processor, cause the apparatus to multiply at least one of the magnitudes by a weighting factor.

10. The apparatus according to claim 1, wherein the at least one memory and the computer program code are further configured to, with the at least one processor, cause the apparatus to modify the determined maximum power reduction metric by adding a constant to the determined maximum power reduction metric or by multiplying the determined maximum power reduction metric by a weighting factor.

11. The apparatus according to claim 1, wherein a high speed control channel is included in the signal being transmitted, and the magnitude of the high speed control channel in the signal being transmitted is added to the sum of the magnitudes of the control channels in order to determine the maximum power reduction metric.

12. The apparatus according to claim 1, wherein the at least one memory and the computer program code are further configured to, with the at least one processor, cause the apparatus to modify the determined maximum power reduction metric by multiplying the determined maximum power reduction metric by a weighting factor.

13. The apparatus according to claim 1, wherein the control of the transmit power of the transmitter based on the determined maximum power reduction value comprises control of the transmit power of only one or more of the data channels being transmitted via the transmitter.

14. The apparatus according to claim 1, wherein the control of the transmit power of the transmitter based on the determined maximum power reduction value comprises control of the transmit power of the data channels and control channels being transmitted via the transmitter.

15. A method for use with a transmitter that transmits signals, the method comprising:
    determining a maximum power reduction metric based on a comparison between a sum of a magnitude of each of a plurality of data channels in a signal being transmitted and a sum of a magnitude of each of a plurality of control channels in the signal being transmitted,
    determining a maximum power reduction value based on comparison of the determined maximum power reduction metric to a plurality of thresholds such that the maximum power reduction value varies depending on the relationship between the determined maximum power reduction metric and the thresholds, and
    controlling a transmit power of the transmitter based on the determined maximum power reduction value.

16. The method according to claim 15, wherein the plurality of thresholds are predefined thresholds relating to gain of the signal being transmitted.

17. The method according to claim 15, wherein the thresholds and maximum power reduction values corresponding to the thresholds are provided in a look-up table.

18. The method according to claim 15, wherein the data and/or control channels are modulated by a 4 state pulse amplitude modulation (4PAM).

19. The method according to claim 15, wherein the comparison between the sum of the magnitudes of the data channels and the sum of the magnitudes of the control channels is effected by calculating a ratio between the sum of the magnitudes of the data channels and the sum of the magnitudes of the control channels.

20. The method according to claim 15, wherein a high speed control channel is included in the signal being transmitted, and the magnitude of the high speed control channel in the signal being transmitted is added to the sum of the magnitudes of the data channels when determining the maximum power reduction metric.

21. The method according to claim 15, wherein the magnitude of a respective channel is an amplitude of the respective channel and the amplitude of a respective channel is expressed by a gain factor of the respective channel.

22. The method according to claim 15, wherein the magnitude of a respective channel is a power of the respective channel and the power of a respective channel is expressed by a square of a gain factor of the respective channel.

23. The method according to claim 15, wherein at least one of the magnitudes is multiplied by a weighting factor.

24. The method according to claim 15, further comprising modifying the determined maximum power reduction metric by adding a constant to the determined maximum power reduction metric.

25. The method according to claim 15, wherein a high speed control channel is including in the signal being transmitted, and the magnitude of the high speed control channel is added to the sum of the magnitudes of the control channels when determining the maximum power reduction metric.

26. The method according to claim 15, further comprising modifying the determined maximum power reduction metric by multiplying the determined maximum power reduction metric by a weighting factor.

27. The method according to claim 15, wherein the step of controlling the transmit power of the transmitter based on the determined maximum power reduction value comprises controlling the transmit power of only one or more of the data channels being transmitted via the transmitter.

28. The method according to claim 15, wherein the step of controlling the transmit power of the transmitter based on the determined maximum power reduction value comprises controlling the transmit power of the data channels and control channels being transmitted via the transmitter.

29. A non-transitory computer-readable storage medium comprising computer-executable instructions which, when executed on a computing device and in conjunction with a transmitter that transmits signals, cause the computing device to carry out a method comprising:
    determining a maximum power reduction metric based on a comparison between a sum of a magnitude of each of a plurality of data channels in a signal being transmitted and a sum of a magnitude of each of a plurality of control channels in the signal being transmitted,
    determining a maximum power reduction value based on comparison of the determined maximum power reduction metric to a plurality of thresholds such that the maximum power reduction value varies depending on the relationship between the determined maximum power reduction metric and the thresholds, and
    controlling a transmit power of the transmitter based on the determined maximum power reduction value.

\* \* \* \* \*